United States Patent [19]
Craxton

[11] 3,790,875
[45] Feb. 5, 1974

[54] DIGITAL TO ANALOGUE CONVERTER

[75] Inventor: Robert Trevor Craxton, Rugby, England

[73] Assignee: Autoflow Engineering Limited, Rugby, England

[22] Filed: Nov. 24, 1971

[21] Appl. No.: 201,747

[52] U.S. Cl. .............................................. 318/573
[51] Int. Cl. .......................................... G05b 11/14
[58] Field of Search ........................... 318/573, 604

[56] References Cited
UNITED STATES PATENTS
3,066,868 12/1962 Tripp ............................. 318/573 X
3,136,933 6/1964 Whitemore et al. ................ 318/573

Primary Examiner—Bernard A. Gilheany
Assistant Examiner—W. E. Duncanson, Jr.
Attorney, Agent, or Firm—Mawhinney & Mawhinney

[57] ABSTRACT

A lens generating machine is provided with electrical digital to analogue converters for controlling various functions of the machine, the converters each including a specially-wound transformer provided on a secondary winding thereof with tapping points corresponding to digital control instructions concerning various lens optical parameters associated with said machine functions, operation of the machine being controlled through switch means for selectively effecting connection to said tappings to make available voltages which are the analogue equivalents of the corresponding control instructions and which are utilised to effect the necessary machine functions to produce a lens with the desired optical characteristics, for example, a toric lens.

9 Claims, 8 Drawing Figures

DIGITAL TO ANALOGUE CONVERTER

This invention relates to a lens generating machine and is particularly, but not exclusively, concerned with a lens generating machine for generating toric lenses.

The use of known lens generating machines involves direct setting of certain lens optical parameters, such as surface curvature and thickness, which are required to produce a lens of given overall optical power. This direct setting is performed manually in an analogue manner, typically by manipulating the setting dial of a potentiometer which is electrically connected to some form of servomechanism controlling an appropriate function of the lens generating machinery. The non-linearity inherent in the relationship between the necessary machine functions for various optical parameter input settings means that a setting dial calibrated with a non-linear scale must be employed. Consequently, the accuracy of visual setting attainable by an operator varies over the scale and at concentrated parts of the scale the setting process becomes very time-consuming, even for a skilled operator.

It is an object of the invention to achieve a lens generating machine which will respond to instructions in digital form concerning various lens optical parameters and generate a lens with the required optical characteristics.

A further object of the present invention is to provide a lens generating machine provided with an electrical digital to analogue converter for controlling a function of the machine, including a transformer with a primary winding for connection to an alternating current supply, a secondary winding provided with a plurality of non-linearly spaced tappings corresponding to digital control instructions concerning a lens optical parameter associated with said machine function, switch means for selectively effecting connection to said tappings whereby to make available a voltable which is the analogue equivalent of the corresponding control instruction and actuator means responsive to said voltage for effecting the machine function to produce a lens with the desired optical characteristics.

Preferably, there is provided a transformer and associated switch means for each required machine function.

Desirably, the or each machine function is performed by an appropriate servomechanism there being provided means responsive to the actual value of the machine function, and comparator means for producing an error signal proportional to the difference between the desired value, as represented by voltage analogue of the appropriate control instruction, and actual value of the machine function, which error signal is fed as an input to the servomechanism. Conveniently, the or each comparator includes an operational amplifier.

Preferably, there is provided for a machine function one or more additional transformers and associated switch means arranged to provide interpolation between the adjacent switch positions of the preceding transformer and thereby enable more precise instructions regarding machine functions to be converted into an analogue voltage form.

Desirably, the switch means for each transformer comprises a plurality of relays with contacts connected to separate tappings of the transformer secondary winding and selectively operable by a common relay selector means.

In practice, it is desirable that compensation means are provided to compensate for computational errors associated with the digital to analogue conversion of various lens optical parameters in order to produce the required overall lens characteristics, said compensation means being arranged to apply a voltage of appropriate polarity to the analogue voltage output of an appropriate stage of a digital to analogue converter whereby to effect an appropriate correction in the resultant machine setting. In addition, it is desirable that further compensation means are provided for interconnecting digital to analogue converter circuitry associated with two or more lens parameters which have a geometrical interaction upon the overall lens characteristics in such a manner as to provide an analogue simulation of said interaction in terms of applied voltages.

In some embodiments of the invention the lens generating machine is arranged for the production of toric lenses and said machine functions utilised comprise the two radii of curvature of the lens face, the lens thickness and the curvature of the lens back in order to achieve a lens of the required overall optical power.

There now follows a description of a particular embodiment of the invention, by way of example only, with reference to the accompanying drawings, in which.

The present embodiment of the invention is concerned with the production of toric lenses, that is, lenses of which at least one face has two separate radii of curvature, known respectively as base and cylinder radii, about two mutually perpendicular axes. Geometrically, for a toric lens, the base curvature is less than the cylinder curvature, the limit condition being the case of a true spherical surface in which the base and cylinder curvatures are equal.

The base and cylinder curvatures are generated on what is known as the lens face, and the opposite face of the lens, referred to as the lens back, has a determinable optimum radius of curvature. These three radii of curvature, together with the lens thickness constitute four basic optical parameters which determine the overall optical power of a lens formed from material of any given refractive index.

Figure 1:
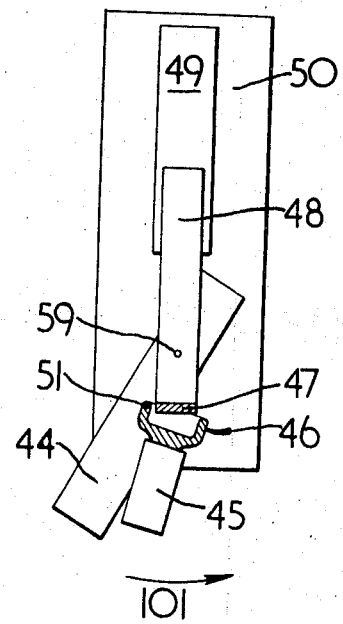
FIGS. 1, 2, 3 and 4 illustrate in block schematic form the generation of toric lenses.
Figure 2:
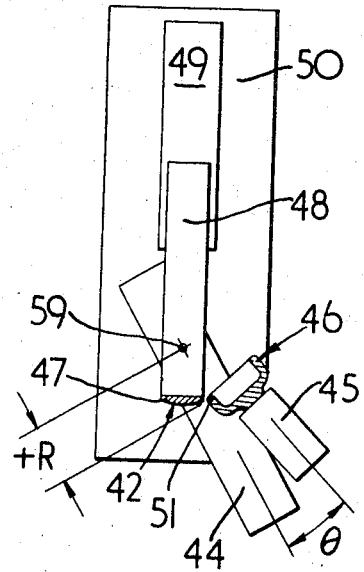
Figure 3:
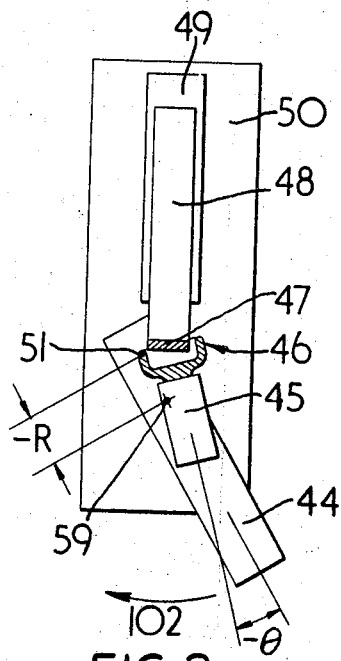
Figure 4:
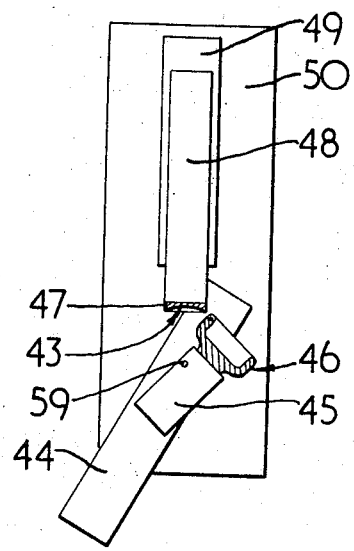

The machine settings involved in generating a toric lens of predetermined overall optical power are more readily appreciated from FIGS. 1, 2, 3 and 4, of which FIGS. 1 and 2 illustrate the generation of a convex or 'positive' toric surface 42, and FIGS. 3 and 4 illustrate the generation of a concave or 'negative' toric surface 43. The toric lens generating machine is of generally known form and, for clarity, only the principal machine elements are illustrated.

A moulded lens blank 47 upon whose face a toric surface is to be generated is mounted in a specially formed support attached to the end of a tailstock 48 supported axially movable on a tailstock slide 49 mounted on to the machine bed 50. Generation is performed by a revolving cutter wheel 46, in practice including a diamond abrasive or cutting edge, mounted on a spindle unit 45. The latter is mounted upon a headstock slide 44 and can pivot relative thereto about a variable pivot point, indicated at 51.

The headstock slide 44 can swing through an arc about a fixed pivot point, indicated at 59, on the tailstock 48. The direction of sweep of the headstock slide is indicated by arcuate arrows 101 and 102 in FIGS. 1 and 3 respectively.

The angle '$\theta$' between the headstock slide 44 and the spindle assembly 45 constitutes the machine setting for the base curvature of the toric surface to be generated and the distance 'R' along the headstock slide axis between the fixed pivot point 59 and the movable pivot point 51 represents the machine setting for the cylinder curvature of the toric surface. FIGS. 1 and 3 illustrate the situation before the cutting sweep and FIGS. 2 and 4 illustrate the situation after the cutting sweep.

A common operating sequence is to start with a lens blank 47 which is roughly moulded to shape and size with an appropriate back curvature, and then to generate on the lens face a toric surface with base and cylinder curvatures by removing an amount of lens material sufficient to produce a lens of the minimum thickness consistent with the required overall optical power. It should be appreciated that the lens thickness referred to in the specification is normally taken at the optical centre of the lens.

Figure 5:
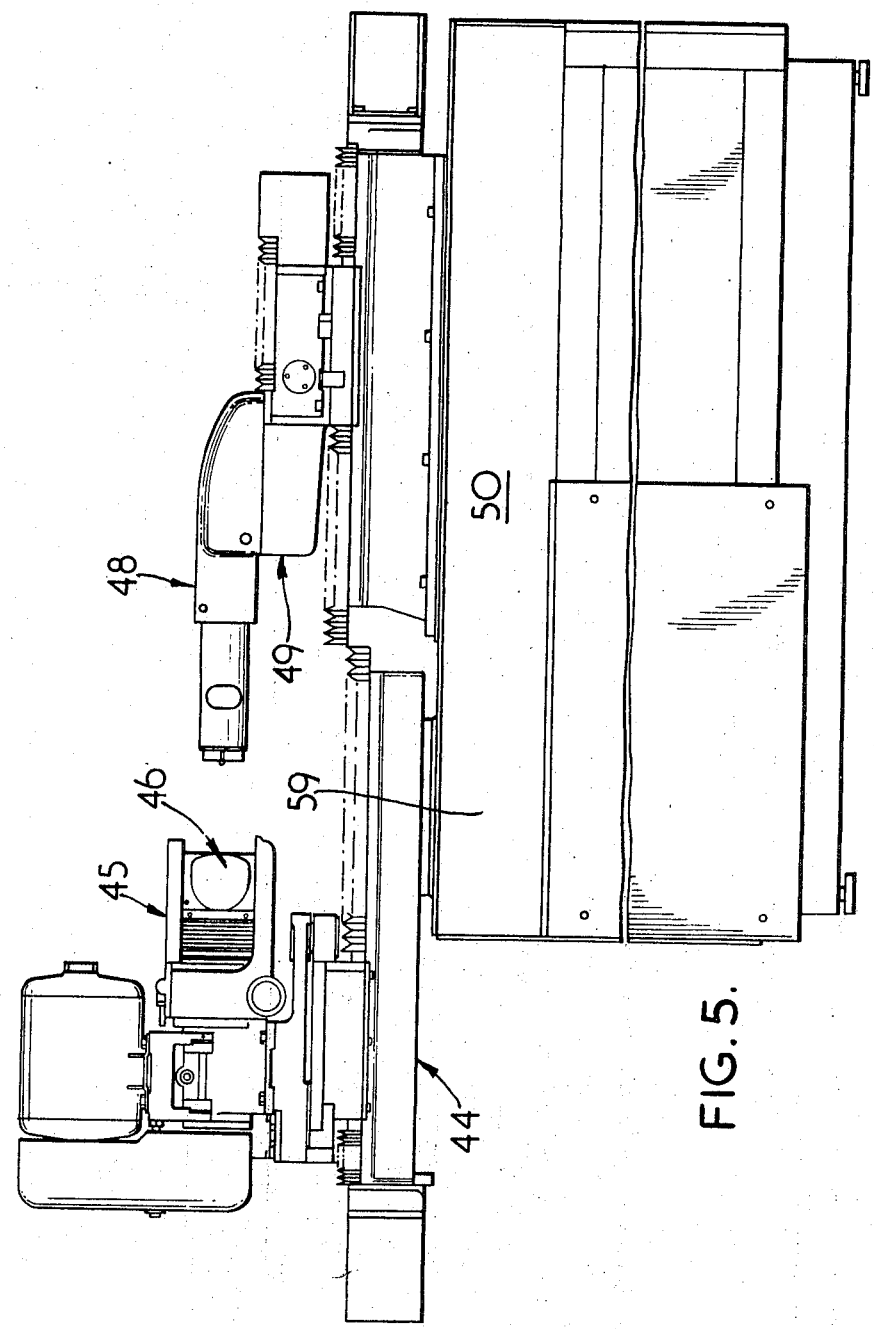
FIG. 5 shows a side elevation of a machine for generating toric lenses.
Figure 6:
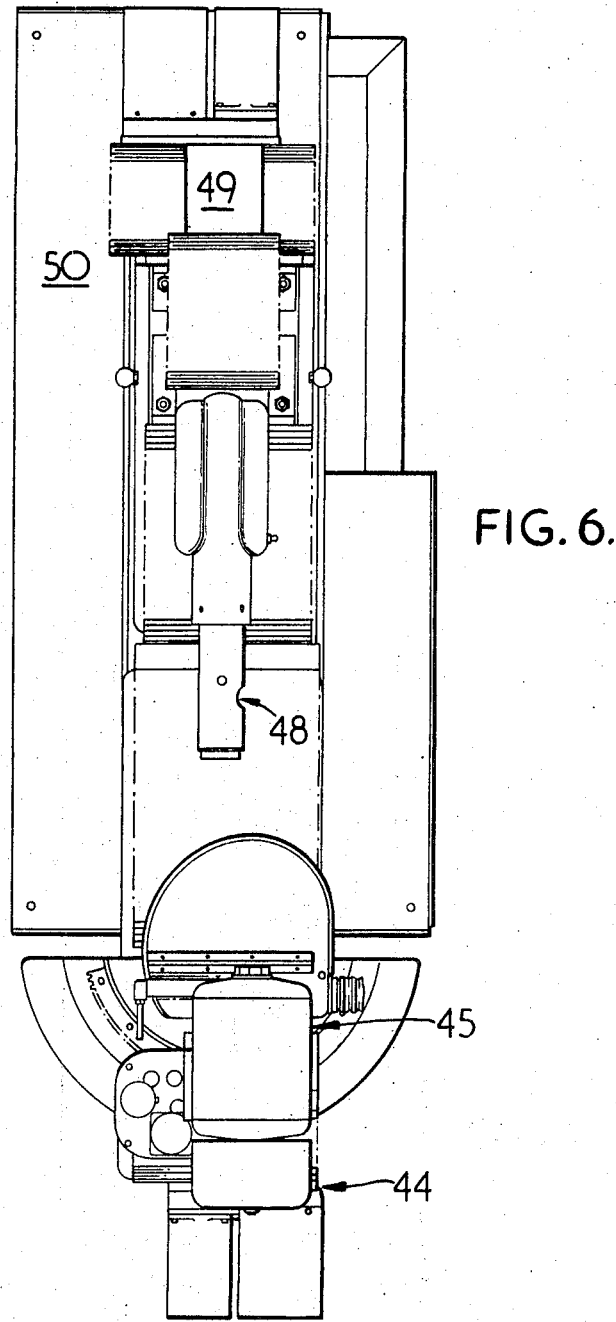
FIG. 6 shows a plan view of the machine shown in FIG. 5.

FIGS. 5 and 6 show in greater detail than FIGS. 1 to 4 an actual machine for generating toric lenses employing the same principal machine elements, which has been accorded identical references. The machine is again of generally known form and since its various detailed mechanical features of construction do not themselves form part of the present invention they will not be described.

Figure 7:
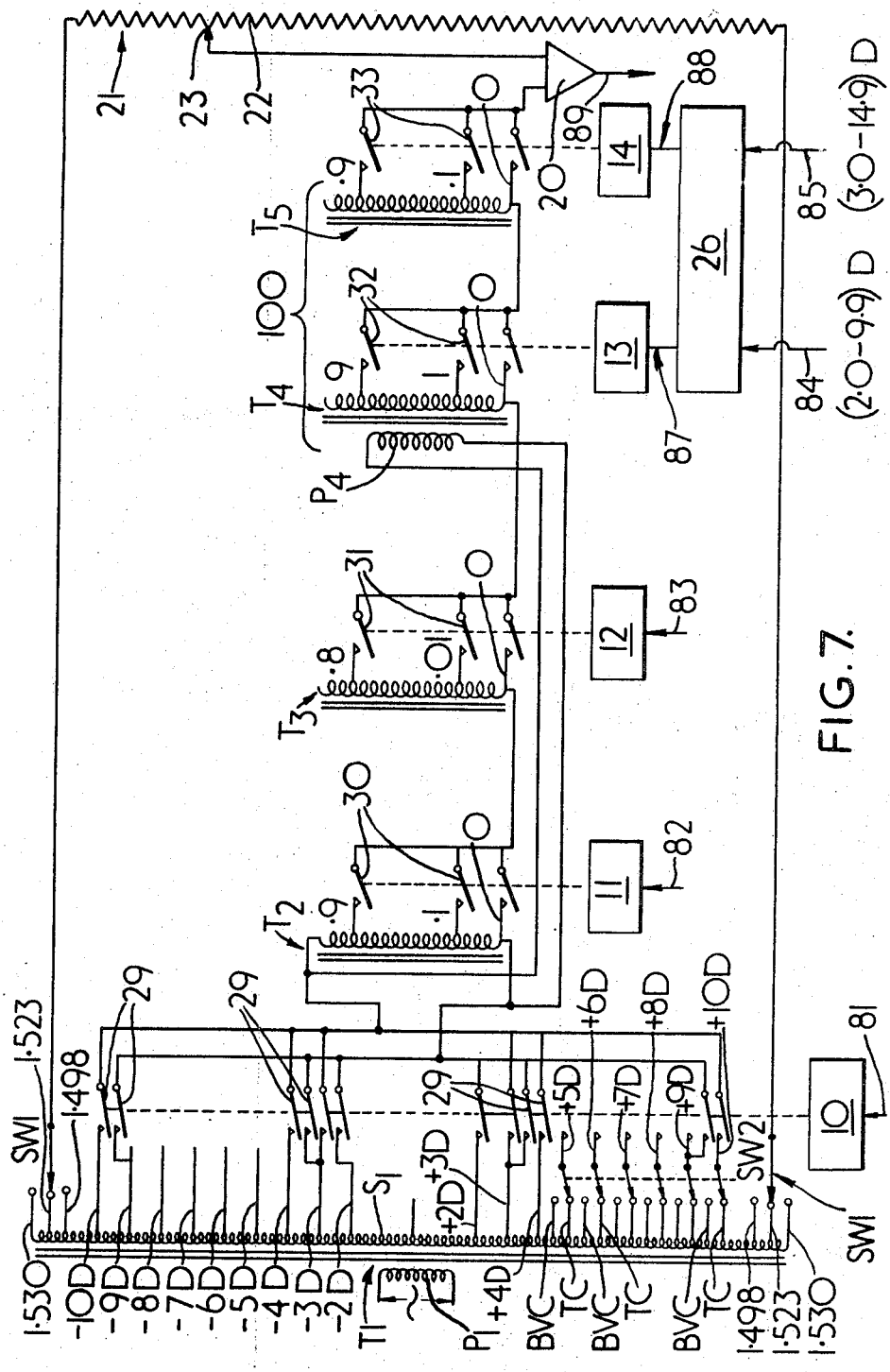
FIG. 7 shows diagrammatically a part of control circuitry for the machine shown in FIGS. 5 and 6.
Figure 8:
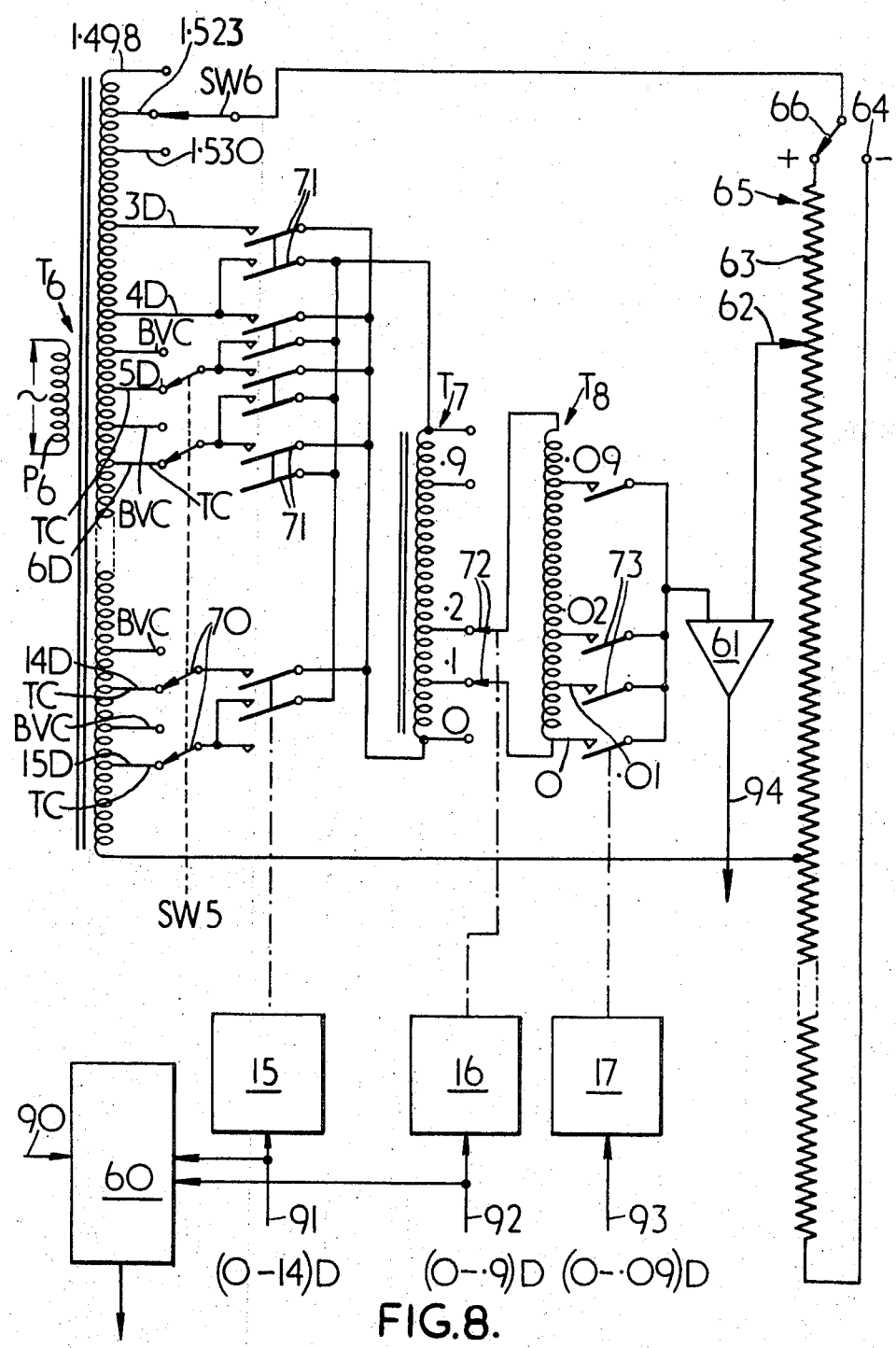
FIG. 8 shows diagrammatically another part of the control circuitry for the machine shown in FIGS. 5 and 6.

The setting of the various optical parameters into the machine is performed electrically by means of control circuitry including digital to analogue converters. FIGS. 7 and 8 illustrate, in simplified form for clarity, circuitry for controlling the base and cylinder curvature settings, respectively. Essentially transformers with a number of discrete tappings are employed to effect a conversion from a digital input, corresponding to a required curvature in Dioptres, to an analogue voltage output which is fed as a 'required' machine setting to a comparator which also receives an input representing the 'actual' machine setting and formulates a difference or 'error' signal which is utilised to effect an appropriate change in machine setting. Thus, the manner of operation resembles a conventional closed loop servo control system.

Referring to FIG. 7, a digital to analogue converter for base curvature includes a toroidally-wound transformer $T_1$ including a primary winding $P_1$ connected to an a.c. supply and a secondary winding $S_1$ provided with a series of specially-spaced tappings, corresponding to individual Dioptre values in the range from +10 to −10 Dioptres. The spacing of the tappings is such that the voltage tapped between any two adjacent tappings represents the voltage analogue of the higher of the Dioptre values associated with these two tappings and would, if fed directly to the appropriate machine actuator (in this case a mechanism controlling the '$\theta$' setting), result in a base curvature of that Dioptre value being generated. Connection to the tappings is made through a series of independently operable relays with pairs of contact arms 29 associated with pairs of adjacent tappings. A common relay selector unit 10 is employed to actuate an appropriate relay.

The voltage available between the pair of tappings selected by the associated relay arms 29 is fed to a first interpolation stage including a transformer $T_2$ with a secondary winding provided with a series of tappings corresponding to decimal fractions, in this case tenths of a Dioptre. Connection to an appropriate one of these tappings is effected through a series of independently operable relays including contact arms 30 under the control of a relay selector unit 11. The voltage tapped is the analogue equivalent of the required base curvature Dioptre setting to one decimal place.

A further increase in precision of Dioptre setting is achieved by means of a third and final interpolation stage including a transformer $T_3$ with a secondary winding provided with a series of tappings corresponding to hundredths of a Dioptre value. A series of independently operable relays with contact arms 32 under the control of a relay selector unit 12 is arranged to effect connection to a tapping corresponding to a required hundredths of a Dioptre setting.

The resultant voltage from the transformer $T_3$ is the electrical sum of the voltages derived from the secondary winding associated with all three transformers $T_1$, $T_2$ and $T_3$ and represents the voltage analogue of the required base curvature Dioptre setting to two decimal places. In practice, no greater precision than this is required and thus there are no further interpolation stages.

As far as the operator of the machine is concerned, the required three-digit base curvature Dioptre setting is achieved by selecting the first, second and third digits as represented inputs 81, 82 and 83 respectively on the relay selector units 10, 11 and 12.

In practice, in order to achieve a lens of the required overall optical power, it is necessary to take account of the fact that, although the nominal overall lens optical power is related to the difference between the Dioptre values of the two lens faces, the lens is of finite thickness and thus the two lens faces are separated. In order to compensate for the error that would otherwise be introduced, the radius of curvature of one lens face is changed. This is referred to as "back vertex compensation" (b.v.c.). A strictly accurate b.v.c. would require a large number of different polishing tools in order to produce the full range of radii of curvature and thickness and thus an average b.v.c. factor is employed. The latter is based upon an average thickness value for the lens employed and is satisfactorily precise for most purposes, at least in relation to eyesight correction, except possibly for very thick lenses.

The average b.v.c. is represented electrically by a "correction" voltage derived from an additional 'BVC' tappings on the secondary winding, of the transformer $T_1$. Thus, for a selected first digit of the base curvature Dioptre setting effected through the relay arms 29 there is an additional overriding switch facility, indicated by SW2, which effects connection to an adjacent BVC tapping; uncorrected or "true-curve" tapping connections are indicated by the reference 'TC.'

It should be appreciated that b.v.c. is only applied for 'positive' base curvatures and that consequently the BVC tappings on the secondary winding $S_1$ of transformer $T_1$ are only present for '+Dioptre' settings. Furthermore, although control circuitry, including a digital to analogue converter, is employed to set the required lens thickness on the machine, this 'thickness setting' does not affect the b.v.c. since, as previously explained, an average b.v.c. is used.

Provision is also made for making another correction to the analogue voltage representing the desired base curvature Dioptre setting because of a geometrical interaction existing between the base and cylinder curvatures inherent in the method of lens generation used which is, in any case, only an approximation. Thus, if the cylinder curvature is changed there must be an appropriate associated change in base curvature. This involves adding an increasing amount to the base curvature machine setting for an increasing difference between base and cylinder curvatures. Referring to FIG. 7, this is achieved electrically by employing a base curve compensation stage 100 including two additional transformers $T_4$ and $T_5$ to add a small voltage of appropriate value to the net analogue voltage tapped from the transformers $T_1$, $T_2$ and $T_3$. The primary winding $P_4$ of the transformer $T_4$ is connected to receive the voltage available across the selected tappings of the transformer $T_1$.

A subtractor unit 26 is utilised to formulate the difference between the Dioptre values of the base and cylinder curvatures and to produce an output 87 representing the first digit of the difference in Dioptre values and an output 88 representing the second digit thereof. The outputs 87 and 88 are fed to relay selector units 13 and 14 respectively, arranged to actuate appropriate contact arms 32 and 33 of two sets of independently-operable relays associated with the transformers $T_4$ and $T_5$.

The net fully corrected voltage available from the selected tapping of transformer $T_5$ represents the voltage analogue of the 'required' machine setting for base curvature and is fed as an input to an operational amplifier 20 along with an input representing the 'actual' machine setting for base curvatures and derived from a linear potentiometer 21. The latter includes a wiper arm 23 movable by the appropriate machine elements for controlling the machine 'θ' setting along a track comprising a winding 22 connected across the voltage available across the entire secondary winds $S_1$ of the transformer $T_1$. The difference between the 'actual' and 'required' Dioptre setting values is fed as an error signal 89 to effect an appropriate adjustment in machine 'θ' setting for base curvature.

In order to take into account different retractive indices of lens glass, a switch SW1 is provided on the secondary winding $S_1$ with three positions corresponding to the refractive indices of the glass likely to be encountered in practice.

The control circuitry for effecting the cylinder curvature Dioptre setting is generally similar to that for the base curvature and is illustrated in simplified form in FIG. 8. A transformer $T_6$ is employed to form the 'unit' Dioptre values and two interpolation stages, including transformers $T_7$ and $T_8$ are utilised to form the tenth and hundredth Dioptre values. The net voltage available at the selected tapping of transformer $T_8$ is fed as an input representing the 'required' cylinder curvature Dioptre setting to an operational amplifier 61, together with an input representing the 'actual' cylinder curvature Dioptre setting derived from a linear potentiometer 65 including a wiper arm 62 movable by an appropriate machine element for controlling the 'R' setting along a track comprising a winding 63. A switch 66 is provided to reverse the connections to the winding 63 for negative Dioptre settings (as illustrated in FIGS. 3 and 4) indicated by the minus symbol on contact 64. The output 94 of the operational amplifier 61 represents the difference or 'error' between the actual and desired cylinder curvature Dioptre settings and is fed to the appropriate machine element to effect an appropriate adjustment to the cylinder curvature.

As far as the machine operator is concerned the setting of cylinder curvature is achieved by selecting the first, second and third digits of the Dioptre value, as represented by inputs 91, 92 and 93, an appropriate relay selector units 15, 16 and 17 respectively.

The relay selector unit 15 is arranged to effect independent control of pairs of relay arms 71 associated with tappings on the secondary winding of the transformer $T_6$. The latter is provided with BVC tappings to which connection is made by means of a switch SW5 with contact arms 70, in a similar manner to that previously described for the transformer $T_1$. A switch SW6 equivalent to the switch SW1 for the transformer $T_1$ is employed to compensate for different retractive indices of lens material.

The relay selector unit 16 is arranged to control the selection of tappings corresponding to tenths of a Dioptre setting on the transformer $T_7$ by means of a pair of relay arms 72. The voltage tapped is applied to the secondary winding of the transformer $T_8$ which is provided with tappings corresponding to hundredths of a Dioptre setting. Connection is made to a selected one of the latter tappings through an appropriate relay arm 73 operable by the relay selector unit 17.

Provision is made for limiting the angle of sweep of the headstock slide 44 in accordance with the desired cylinder curvature by means of a sweep angle control unit 60 arranged to receive an input 90 representing the actual sweep setting and inputs 91, 92 representing the first two digits of the desired cylinder curvature Dioptre setting. The resultant output (unlabelled) is used to effect any necessary change in sweep setting.

As indicated in FIGS. 7 and 8, the ranges of Dioptre values for the base and cylinder curvatures are from plus 10 to minus 10 and from zero to plus 15 respectively. However, in order to form the two-digit Dioptre difference between the base and cylinder curvatures in the digital subtractor unit 26, the ranges of from 2.0 to 9.9 and from 3.0 to 14.9 respectively are employed.

The digital to analogue converters and control system described herein may be adapted to receive digital information directly from a data processing device used, for example, to calculate the optical parameters required for a lens of required optical characteristics. Electronic electromechanical switches could be employed to effect connection to the various tappings of the non-linear transformers in place of manually operated switches.

What I claim as my invention and desire to secure by Letters Patent of the United States is:

1. A lens generating machine for generating lenses with desired parameters including front and rear lens surface radii of curvature and lens thickness, which machine comprises support means for supporting a lens upon whose surface a desired curvature is to be generated, a cutter for generating said surface curvature, positioning means for relatively positioning said cutter and lens in accordance with discrete electrical operating signals which are linearly related to predetermined lens parameters, converter means for receiving discrete control instructions non-linearly related to said predetermined parameters and converting said instructions into said discrete electrical operating signals whereby to effect appropriate operation of said positioning means to produce desired values of lens parameters, said converter comprising a transformer with a primary winding for connection to an alternating current supply, a secondary winding provided with a plurality of non-linearly spaced tappings corresponding to discrete control instructions relating to a lens parameter, switch means for selectively effecting connection to said tappings whereby to make available an electrical operating signal to said positioning means.

2. A machine, as claimed in claim 1, wherein there is provided a transformer and associated switch means for each parameter.

3. A machine, as claimed in claim 1, wherein said positioning means includes means responsive to the actual value of the parameter, comparator means for producing an electrical operating signal proportional to the difference between the desired value of the parameter, as represented by an electrical signal associated with the appropriate control instruction, and an electrical signal representing the actual value of the machine function, which operating signal is fed as an input to the positioning means.

4. A machine, as claimed in claim 3, wherein the comparator means includes an operational amplifier.

5. A machine as claimed in claim 1, wherein there is provided for a parameter one or more additional transformers and associated switch means arranged to provide interpolation between the adjacent switch positions of the preceding transformers and thereby enable more precise control instructions to be converted into electrical operating signals.

6. A machine, as claimed in claim 1, wherein the switch means for each transformer comprises a plurality of relays with contacts connected to separate tappings of the transformer secondary winding and selectively operable by a common relay selector means.

7. A machine, as claimed in claim 1, wherein compensation means are provided to compensate for computational errors associated with the conversion of control instructions in order to produce the required overall lens characteristics, said compensation means being arranged to apply an electrical signal of appropriate polarity to the output of the converter whereby to effect an appropriate correction in the parameter set by the positioning means.

8. A machine, as claimed in claim 1, wherein compensation means are provided for interconnecting converter circuitry associated with two or more parameters which have a geometrical interaction upon the overall lens characteristics in such a manner as to simulate said interaction in terms of electrical signals.

9. A machine, as claimed in claim 1, wherein the lens generating machine is arranged for the production of toric lenses and said parameters comprise the two radii of curvature of the lens face, the lens thickness and the curvature of the lens back in order to achieve a lens of the required overall optical power.

* * * * *